United States Patent [19]
Nelson et al.

[11] Patent Number: 6,123,751
[45] Date of Patent: Sep. 26, 2000

[54] FILTER CONSTRUCTION RESISTANT TO THE PASSAGE OF WATER SOLUBLE MATERIALS; AND METHOD

[75] Inventors: Benny Kevin Nelson, Waconia; Mark Alan Gogins, Roseville, both of Minn.

[73] Assignee: Donaldson Company, Inc., Minneapolis, Minn.

[21] Appl. No.: 09/094,083

[22] Filed: Jun. 9, 1998

[51] Int. Cl.[7] .............................. B01D 46/12; B01D 29/07
[52] U.S. Cl. ................................ 95/268; 95/287; 55/302; 55/306; 55/324; 55/327; 55/332; 55/350.1; 55/497; 55/501; 55/521; 55/528
[58] Field of Search .......................... 55/302, 306, 315, 55/318, 320, 324, 327, 332, 342, 350.1, 497–501, 521, 522, 528; 95/45, 46, 268, 273, 280, 286, 287; 96/4

[56] References Cited

U.S. PATENT DOCUMENTS

| | | | |
|---|---|---|---|
| 3,243,943 | 4/1966 | Getzin | 55/501 X |
| 3,511,337 | 5/1970 | Pease et al. | 55/315 X |
| 3,631,654 | 1/1972 | Riely et al. | 55/324 X |
| 3,828,524 | 8/1974 | Booth et al. | 95/268 |
| 3,853,529 | 12/1974 | Boothe et al. | 55/499 |
| 3,950,157 | 4/1976 | Matney | 55/306 X |
| 3,953,566 | 4/1976 | Gore | 264/288 |
| 4,004,899 | 1/1977 | Giacovas | 55/499 |
| 4,135,900 | 1/1979 | Westlin et al. | 55/499 |
| 4,158,449 | 6/1979 | Sun et al. | 55/306 X |
| 4,187,390 | 2/1980 | Gore | 55/486 X |
| 4,234,323 | 11/1980 | Maher | 95/287 X |
| 4,300,918 | 11/1981 | Cary | 95/268 |
| 4,452,616 | 6/1984 | Gillingham et al. | 55/302 |
| 4,504,293 | 3/1985 | Gillingham et al. | 55/302 X |
| 4,619,675 | 10/1986 | Watanabe | 55/498 |
| 4,652,285 | 3/1987 | Greene | 55/501 X |
| 4,878,930 | 11/1989 | Manniso et al. | 55/521 X |
| 4,945,125 | 7/1990 | Dillon et al. | 527/427 |
| 5,026,591 | 6/1991 | Henn et al. | 428/198 |
| 5,066,683 | 11/1991 | Dillon et al. | 521/54 |
| 5,157,058 | 10/1992 | Dillon et al. | 521/134 |
| 5,350,515 | 9/1994 | Stark et al. | 55/521 X |
| 5,362,553 | 11/1994 | Dillon et al. | 428/246 |
| 5,397,632 | 3/1995 | Murphy, Jr. et al. | 55/521 X |
| 5,403,367 | 4/1995 | DeVilliers et al. | 55/320 |
| 5,478,372 | 12/1995 | Stark | 55/521 |
| 5,562,746 | 10/1996 | Raether | 55/302 |
| 5,653,786 | 8/1997 | Taylor et al. | 95/268 |
| 5,820,645 | 10/1998 | Murphy, Jr. | 55/521 X |
| 5,853,439 | 12/1998 | Gieseke et al. | 55/350.1 X |
| B1 4,395,269 | 8/1994 | Schuler | 55/302 |

FOREIGN PATENT DOCUMENTS

WO 95/05234  2/1995  WIPO .

OTHER PUBLICATIONS

"The New GDX™ Self–Cleaning Air Filter From Donaldson." Bulletin 3000–31, 4 pgs, Available to public prior to filing date.

"Genuine Duralife™ Filter Cartridges From Donaldson." Bulletin 3000–33, 4 pgs, Available to public prior to filing date.

"GDX™ Pulse Cleaning Filter System." Donaldson® Gas Turbine Systems Brochure #3000–46,4 pgs. (Copyright 1996).

"Spider–Web® Filter Media." Donaldson® Gas Turbine Systems Brochure #3000–35, 4 pgs. (Copyright 1994).

*Primary Examiner*—Robert Spitzer
*Attorney, Agent, or Firm*—Merchant & Gould P.C.

[57] ABSTRACT

The present disclosure relates to systems and methods that use a hydrophobic medium to remove salt and moisture from the intake air of a gas turbine system. The disclosure also relates to systems and methods that use a two stage filtering process to remove particulate material, salt and moisture from the intake air of a gas turbine system. Particulate material is filtered from the intake air at a first stage air cleaner. Subsequently, salt and moisture are removed from the intake air at a second stage salt barrier located downstream from the first stage air cleaner. In certain embodiments, the second stage salt barrier uses a hydrophobic medium to remove salt and moisture from the intake air.

19 Claims, 5 Drawing Sheets

FILTER CONSTRUCTION RESISTANT TO THE PASSAGE OF WATER SOLUBLE MATERIALS; AND METHOD

FIELD OF THE INVENTION

The present invention relates to air filter systems. In certain applications it concerns air filters for use in the air intake stream of gas turbine systems. In specific applications, it concerns filter constructions applied in gas turbine systems which are constructed to resist passage of moisture and/or salt therethrough. Methods of filtering to achieve such effect are also provided.

BACKGROUND OF THE INVENTION

Although the present invention may be applied in a variety of applications, it was developed for use with gas turbine filter systems. Single stage, self cleaning air filter systems are known. One such system, commercially available, is the Donaldson GDX™ Pulse Cleaning Filter System available from Donaldson Company, Inc., Minneapolis, Minn. In FIG. 1, a schematic, cross-sectional, depiction of a Donaldson GDX™ Pulse Cleaning Filter System 20 is presented.

Referring to FIG. 1, the system 20 includes a chamber 21 having an air inlet side 22 and an air outlet side 23. Air enters the chamber 21 through a plurality of vertically spaced inlet hoods 26 positioned along the air inlet side 22. The inlet hoods 26 function to protect internal filters of the system 20 from the effects of rain, snow and sun. Also, the inlet hoods 26 are configured such that air entering the inlet hoods 26 is first directed in an upward direction indicated by arrow 27, and then deflected by deflector plates 28 in a downward direction indicated by arrow 29. The initial upward movement of air causes some particulate material and moisture from the air stream to settle or accumulate on lower regions 30 of the inlet hoods 26. The subsequent downward movement of air forces dust within the chamber 21 downward toward a dust collection hopper 32 located at the bottom of the chamber 21.

The chamber 21 of the system 20 is divided into upstream and downstream volumes 34 and 36 by a partition 38. The upstream volume 34 generally represents the "dirty air section" of the air cleaner system 20, while the downstream volume generally represents the "clean air section" of the system 20. The partition 38 defines a plurality of apertures 40 for allowing air to flow from the upstream volume 34 to the downstream volume 36. Each aperture 40 is covered by an air filter 42 or filter cartridge located in the upstream volume 34 of the chamber. The filters 42 are arranged and configured such that air flowing from the upstream volume 34 to the downstream volume 36 passes through the filters 42 prior to passing through the apertures 40.

For the particular filter arrangement shown, each air filter 42 includes a pair of filter elements. For example, each air filter 42 includes a cylindrical element 44 and, a somewhat truncated, conical, element 46. Each truncated, conical element 46 includes one end having a major diameter and another end having a minor diameter. The cylindrical element 44 and the truncated, conical element 46 of each filter 42 are co-axially aligned and connected end-to-end with the minor diameter end of each conical element 46 being secured to one of the cylindrical elements 44 in a sealed manner. The major diameter end of each truncated, conical element 46 is secured to the partition 38 such that an annular seal is formed around its corresponding aperture 40. Each filter 42 is generally co-axially aligned with respect to its corresponding aperture 40 and has a longitudinal axis that is generally horizontal.

In general, during filtering, air is directed from the upstream volume 34 radially through the air filters 42 into interior volumes 48 of the filters 42. After being filtered, the air flows from the interior volumes 48 through the partition 38, via apertures 40, into the downstream clean air volume 36. The clean air is then drawn out from the downstream volume 36, through apertures 50, into a gas turbine intake, not shown.

Each aperture 40 of the partition 38 includes a pulse jet air cleaner 52 mounted in the downstream volume 36. Periodically, the pulse jet air cleaner 52 is operated to direct a pulse jet of air backwardly through the associated air filter 42, i.e. from the interior volume 48 of the filter element outwardly to shake or otherwise dislodge particular material trapped in or on the filter media of the air filter 42. The pulse jet air cleaners 52 can be sequentially operated from the top to the bottom of the chamber 21 to eventually direct the dust particulate material blown from the filters into the lower hopper 32, for removal.

Arrangements such as those shown in FIG. 1 may be rather large. Filter pairs used in such arrangements commonly include cylindrical filters that are about 26 inches long and about 12.75 inches in diameter, and truncated conical filters that are about 26 inches long, about 12.75 inches in minor diameter, and about 17.5 inches in major diameter. Such arrangements might be used, for example, for filtering intake air to a gas turbine system having an air flow demand on the order of 8000 to 1.2 million cubic feet per minute (cfm).

A variety of types of filter elements have been used in arrangements such as that described above with respect to FIG. 1. Donaldson Company, Inc., for example, markets filter elements under the designation "GDX filter elements" for such systems which comprise pleated paper having a web of submicron diameter fibers applied to a surface thereof, using proprietary, trade secret, Donaldson method, under the designation Spider-Web ®.

SUMMARY OF THE INVENTION

One aspect of the present invention relates to methods and systems that use hydrophobic media to reduce the concentration or amount of water soluble material such as salt present in the intake air of a gas turbine engine or other type of environment that is sensitive to water soluble materials such as salt.

Another aspect of the present invention relates to a gas turbine intake air filter system including a first stage air cleaner for reducing the concentration of particulate material in the turbine intake air, and a second stage filter arrangement located downstream from the first stage air cleaner. The second stage filter arrangement includes a hydrophobic medium arranged and configured to reduce the concentration of moisture/salt solution in the intake air.

A further aspect of the present invention relates to a barrier arrangement for filtering water soluble material such as salt from an air stream such that the concentration of water soluble material is reduced. The barrier arrangement includes a plurality of vertically spaced-apart hydrophobic filter elements. The barrier arrangement also includes a plurality of inclined baffles arranged and configured to direct the air stream upward through the hydrophobic filter elements. Each of the baffles is positioned beneath a corresponding one of the hydrophobic filter elements. In operation, salt solution accumulates on lower surfaces of the filter elements. The accumulated salt solution drips from the filter elements onto the inclined baffles. The inclination of the baffles causes the salt solution to run downward and drip off upstream edges of the baffles.

An additional aspect of the present invention relates to a gas turbine system including a gas turbine adapted to draw intake air. The system also includes a hydrophobic medium through which the intake air is filtered prior to entering the gas turbine.

Still another aspect of the present invention relates to a method for filtering intake air of a gas turbine. The method includes the steps of filtering particulate material from the intake air at a first stage air cleaner, and directing the intake air downstream from the first stage air cleaner through an air flow gap to a second stage salt barrier. The method also includes the steps of reducing the concentration or level of salt in the intake air at the second stage salt barrier, and directing the intake air downstream from the second stage salt barrier to the gas turbine.

One further aspect of the present invention relates to a filter including a pleated filter element having a plurality of pleat tips, and an elastic member having portions that straddle the pleat tips and portions that extend between the pleat tips to maintain pleat spacing. In certain embodiments, the elastic member comprises a coil spring having a plurality of coils positioned between the pleat tips for maintaining pleat spacing of the pleated filter element.

A variety of advantages of the invention will be set forth in part in the description which follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Figure 1:
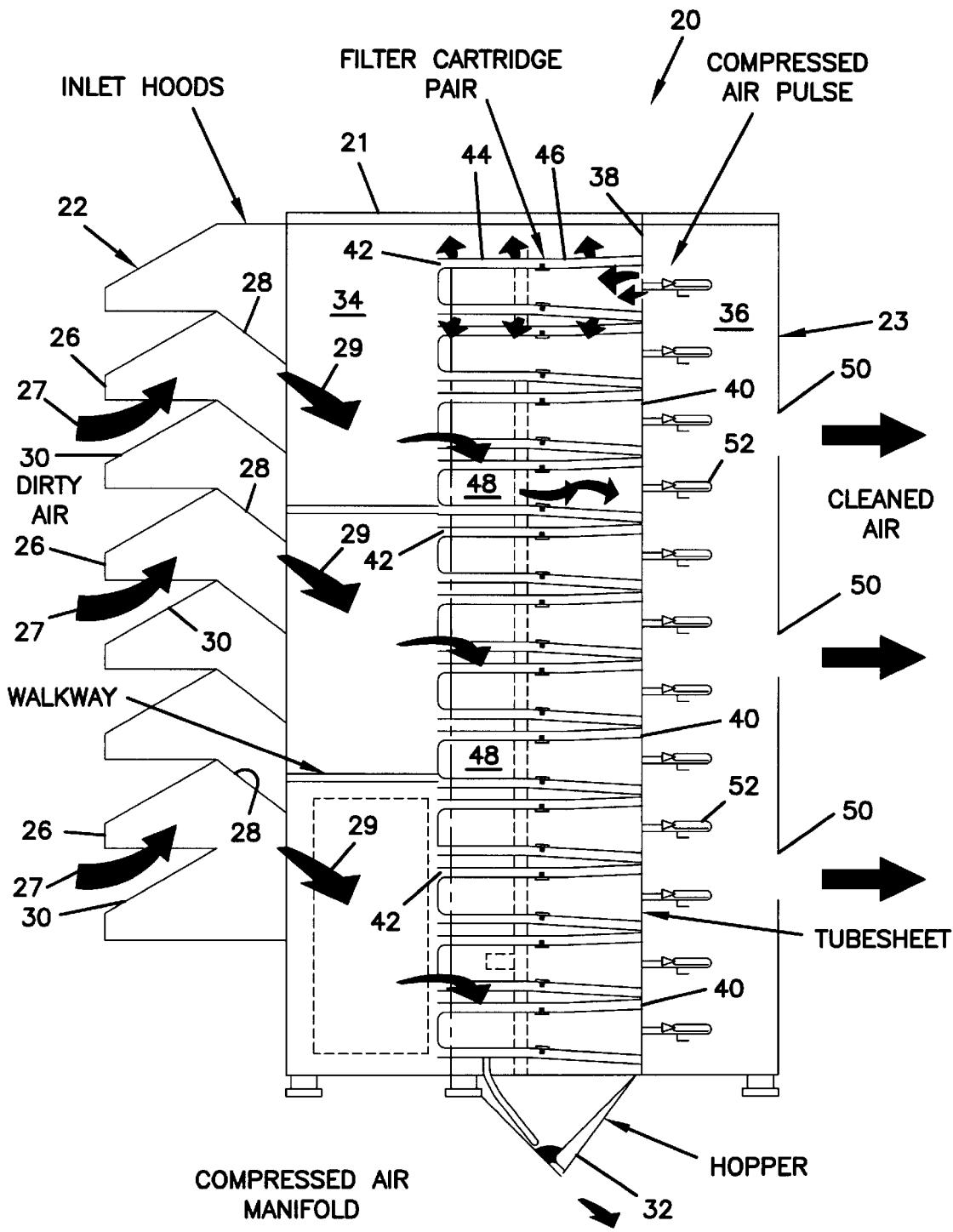
FIG. 1 is a schematic cross-sectional view of a prior art gas turbine intake filtration system.

While various aspects of the present invention are described primarily with respect to gas turbine intake systems, it will be appreciated that the aspects of the present application are also applicable to a variety of other environments that are sensitive to contamination by water soluble materials such as salt. For example, the various aspects of the present invention are applicable to alternative environments such as internal combustion engine intake systems, fuel cell intake systems, clean room intake systems, heating ventilating and air conditioning (HVAC) systems, hospital HVAC systems, air compressor intake systems, clean chamber intake systems (mini-clean room boxes), clean benches and industrial process exhaust filtration.

A. Salt Particles as Contaminant in Gas Turbine Intake Systems

In marine environments, such as offshore environments or seaside environments, airborne salt is generated by wave breaking and is carried by the wind Particle sizes are generally reported to be from submicron up to about 20 microns. In other environments, such as deserts and environments proximate industrial discharges, relatively high concentrations of salt are also present in the air. Salt particles carried in the air are generally salts, such as NaCl, KCl. However, other chemical salts such as ammonium sulfates, magnesium sulfate or other sulfates may also be carried in the air. In general terms, the word "salt" is intended to mean any particulate, contaminate or material that deliquesces or changes physical state with varying humidity conditions. The term "salt" is also intended to mean any material or contaminant that is soluble in water.

High salt concentrations in the air present problems for gas turbine systems. For example, if salt passes through the intake air filter system of a gas turbine system, the salt can coat the ducting and foul the compressor blades of the turbine system. This leads to significant power losses.

Salt particles can penetrate the filter media of filter cartridges, such as those described in connection with FIG. 1 above, in several manners. For example, if the particles are sufficiently small, they can pass through the filter media due to particle size and efficiency of the media. However, a more significant migration of salt through the filter material occurs as a result of moisture contamination.

Moisture contamination is particularly problematic in environments having relatively high humidities such as marine environments. Specifically, if the air passing into an air filtration system is relatively humid, salt collected on the filter elements will go into solution, and then migrate through the filter media When the salt solution reaches the downstream side of the filter media, the salt solution is carried by the air flow stream through the clean air plenum and into downstream duct work, toward the gas turbine. This type of salt migration can cause substantial problems with gas turbine operations and is a particular problem addressed by techniques according to the present invention. It is noted that the techniques described in the present disclosure are also useful with respect to salt migrations that occur in similar manners involving contaminant phase changes with respect to humidity.

B. A General Approach To Inhibiting Salt Deposition on Downstream Ductwork and Gas Turbine Equipment-A Second Stage Moisture/Salt Barrier Construction According to the present disclosure, an approach to inhibiting salt solution migration through filter cartridges in air intake filter systems is provided. The approach generally involves the provision, downstream of the filter cartridges, of a second stage barrier. The barrier generally comprises a secondary air filter comprising at least in part a hydrophobic media. A preferred hydrophobic media is microporous polytetrafluorethylene (PTFE) membrane comprising nodes interconnected by fibers. Such membranes are commercially available from such sources as Tetratec, a division of Donaldson Company, Inc., the assignee of the present invention, under the designation Tetratex®; and from W. L Gore & Associates, under the designation Gore Text®. Preparation of such membranes is described in such references as U.S. Pat. Nos. 5,362,553, 5,157,058, 5,066,683,4, 945,125, 4,187,390, and 3,953,566, which are incorporated herein by reference.

Typical moisture/salt barrier media used in arrangements according to the present invention will comprise a laminate of hydrophobic membrane, such as a microporous polytetrafluorethylene (PTFE) membrane, applied to a support substrate such as an open fibrous supporter scrim made of a material such as a polyester felt. A useable such laminate is a hydrophobic membrane applied to a 6 oz. polyester scrim available, for example, from Reemay Inc. of Charleston, S.C. Such a laminate is commercially available from the Tetratec division of Donaldson Company, Inc., under the designation Tetratex® 6279.

It will be appreciated that a variety of filtering configurations and materials can be used to reduce the concentration or level of moisture and deliquesced salt present in an air stream. By way of non-limiting example, illustrative hydrophobic/moisture filtering materials or fibers include polytetrafluoroethylene, polypropylene, polyethylene, polyvinyl chloride, polysulfone and polystyrene. Materials and fibers can also be made hydrophobic through the use of surface treatments. Illustrative surface treatments include fluorocarbons and silicones. Of course, the particular hydrophobic materials listed herein are strictly examples, and other materials can also be used in accordance with the principles of the present invention.

Figure 4:
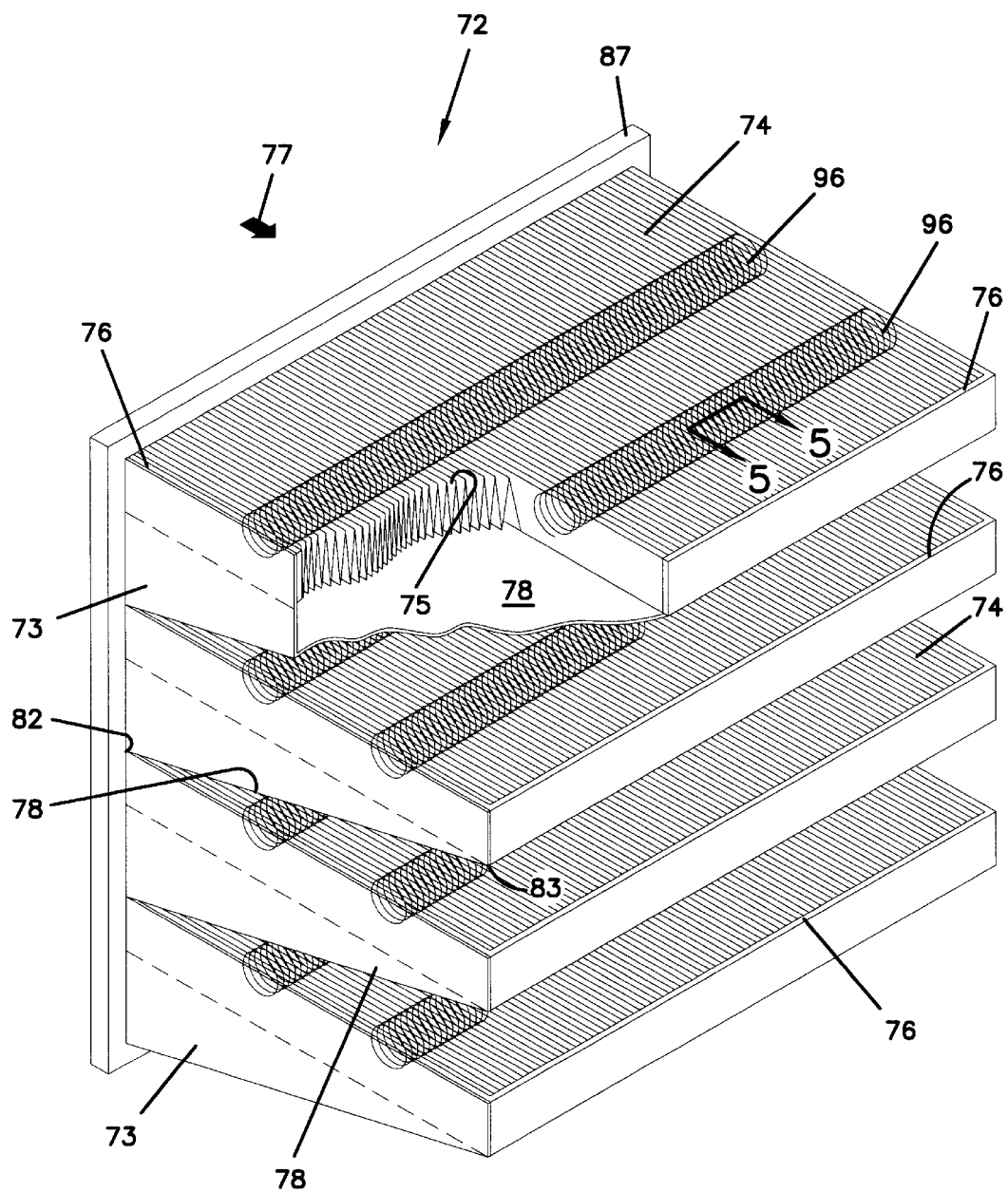
FIG. 4 is a perspective view of the salt barrier arrangement of FIG. 3.

In certain embodiments of the present invention, the second stage filter laminate will be used in a pleated configuration, with a pleat space of about 6–8 pleats per inch, or 4–10 pleats per inch, or at least 3 pleats per inch. Typical preferred constructions will comprise rectangular panel filters, with pleats extending across a length or width of each panel. An example of such a panel filter is illustrated in FIG. 4, described below. A pleat depth of at least about ¼ inches, generally no greater than about 12 inches, and typically about 1 to 4 inches will be preferred. A preferred pore size of the filter media is about 3 microns. An air permeability of at least 4 cfm, generally no greater than 100 cfm, and typically about 7–10 cfm will be preferred. A preferred hydrophobic membrane thickness is about 0.4 mil, while a preferred media thickness, including both membrane and scrim, is in the range of 0.01–0.05 inches. While a pleated filter configuration is preferred, alternative configurations such as Z-configuration filters can also be used.

It is foreseen that in typical gas turbine systems, the second stage construction will be arranged such that the media velocity will be about 4–12 feet per minute (fpm), or about 5–15 fpm, or about 5–40 fpm. More particularly, the media velocity is preferably about 9 fpm, and typically no greater than about 20 fpm. The term "media velocity" in this context refers to the volume of flow through the filter media per unit surface area of filter media. It is also foreseen that in typical gas turbine systems, the second stage construction will be arranged such that the perimeter velocity will be about 500–900 feet per minute (fpm), and typically no greater than about 1000 fpm. The term "perimeter velocity" in this context refers to the volume of flow through the filter media per perimeter area of filter media. Hence, the perimeter velocity does not take into consideration extra area provided by means such as pleating.

Figure 2:
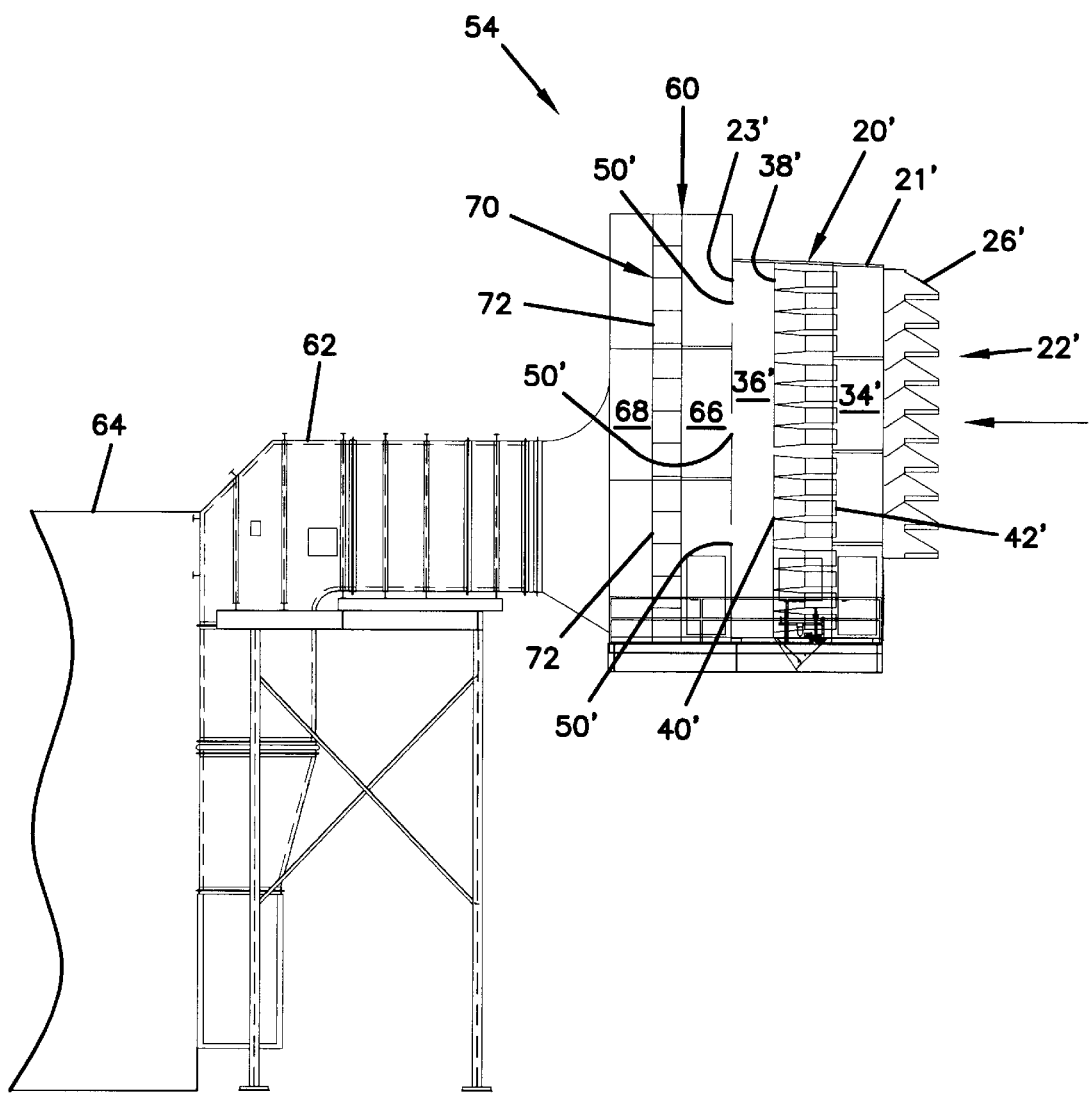
FIG. 2 is a schematic cross-sectional view of a gas turbine intake filtration system constructed in accordance with the principles of the present invention.

FIG. 2 is a schematic cross sectional depiction of a gas turbine intake system 54 including an arrangement according to the present invention. Generally, the system 54 includes a two-stage filtration system for removing both particulate material and airborne salt from intake air drawn through the system to a gas turbine 64. Small gas turbine systems can have air flow demands in the neighborhood of 8000 cfm, while large gas turbine systems can intake air at rates as large as 1.2 million cfm.

The system 54 includes a first stage air cleaner 20', and a second stage salt barrier arrangement 60 positioned downstream from the first stage air cleaner 20'. Ductwork 62 directs filtered air from the salt barrier arrangement 60 to the gas turbine 64.

The first stage air cleaner 20' has a similar configuration to the filtration system 20 depicted in FIG. 1. For example, the first stage cleaner 20' includes a chamber 21' having an air inlet side 22' and an air outlet side 23'. Air enters the chamber 21' through a plurality of vertically spaced inlet hoods 26' positioned along the air inlet side 22'. The chamber 21' of the cleaner 20' is divided into upstream and downstream volumes 34' and 36' by a partition 38'. The upstream volume 34' generally represents the "dirty air section" of the air cleaner 20', while the downstream volume 36' generally represents the "clean air section" of the air cleaner 20'.

The partition 38' defines a plurality of apertures 40' for allowing air to flow from the upstream volume 34' to the downstream volume 36'. Filters 42' or filter cartridges are arranged and configured such that air flowing from the upstream volume 34' to the downstream volume 36' is required to pass through the filters 42' prior to passing through the apertures 40'. The apertures 40' of the partition 38' include pulse jet air cleaners (not shown) for periodically cleaning the filters via backpressure.

It will be appreciated that for small scale operations, as few as one filter 42' and one aperture 40' may be used. By contrast, large scale operation may require hundreds of filter elements 42' and apertures 40'. Also, while filter systems having jet air cleaners are preferred, static systems can also be used. Additionally, other air cleaning configurations can also be used to clean air at the first stage. For example, panel filters, inertial separators, water wash systems, and other techniques for removing particulate materials can also be used.

In general, during filtering, air is directed from the upstream volume 34' radially through the air filters 42' into interior volumes of the filters 42'. After being filtered, the air flows from the interior volumes of the filters 42' through the partition 38', via apertures 40', into the downstream clean air volume 36'. The clean air is then drawn out from the downstream volume 36', through apertures 50', into the second stage salt barrier arrangement 60.

The air filters 42' preferably include a cellulose or synthetic filter media arranged in a pleated configuration. In certain embodiments, a web of sub-micron diameter fibers, such as Spider-Web® Filter Media available from Donaldson Company, is bonded to the outer surface of the filter media It is foreseen that in typical gas turbine systems, the first stage construction will be arranged such that the media velocity will be in the range of 1–5 feet per minute (fpm), and typically no greater than about 5 fpm.

The first stage air cleaner 20' preferably has relatively high filtering efficiencies with respect to particulate material. For example, filters having initial filtration efficiencies in the range of 65–75%, or greater than 65% can be used. Filtration efficiencies are preferably determined using American Society for Testing and Materials (ASTM) standard test ASTM F1215-89 for determining the initial efficiency of a flatsheet filter medium in an airflow using latex spheres. Preferably the test is conducted with a single particle size of 0.76 micrometers and a single face velocity of 20 feet per minute. It will also be appreciated that for some applications, it may be desirable to use air cleaners having filtration efficiencies other than those specified above.

Referring back to FIG. 2, the second stage salt barrier arrangement 60 is located immediately downstream from the first stage air cleaner 20' and functions to reduce the concentration of deliquesced salt in the air that exits the first stage air cleaner 20'. The barrier arrangement 60 includes an upstream volume or side 66 and a downstream volume or side 68. A substantially vertical rack 70 is positioned between the upstream and downstream sides 66 and 68. The clean air volume 36' and the upstream volume 66 preferably form an air flow gap between the first stage air cleaner 20' and the second stage salt barrier arrangement 60. The outlet side 23' can include a wall defining apertures similar to the outlet side 23 of FIG. 1, or can be open to promote substantially unrestricted flow between the clean air volume 36' and the volume 66.

A plurality of filter modules 72 are mounted on the rack in a vertically stacked relationship. Each of the filter modules 72 includes a filter medium, such as the hydrophobic filter medium described previously, adapted for removing or filtering salt and moisture from the air stream such that the concentration of salt solution in the intake air is reduced. The filter modules 72 are mounted in a sealed relation with respect to the rack 70 such that air from the upstream side 66 is required to pass through a filter medium to reach the downstream side 68.

Figure 3:
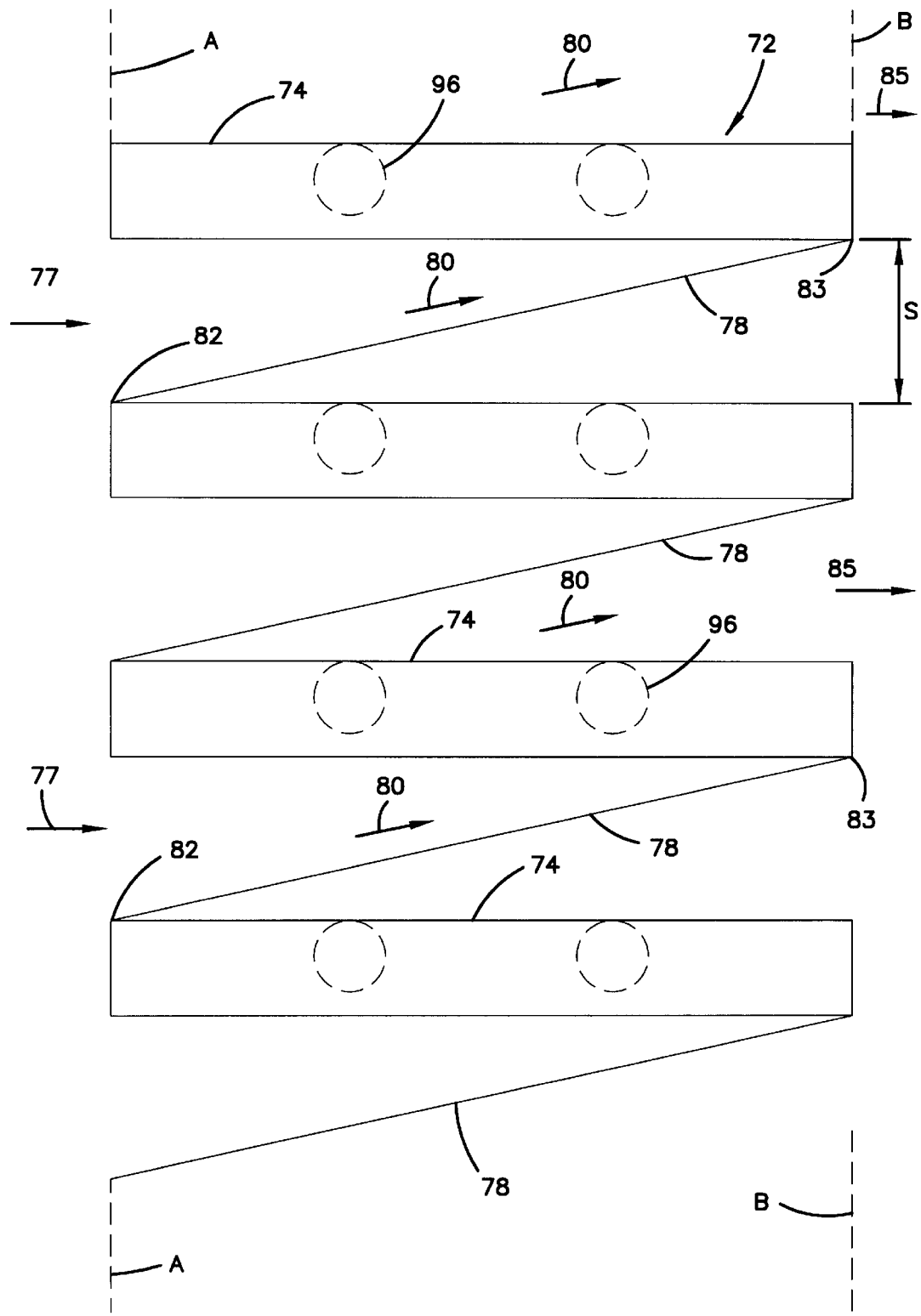
FIG. 3 is a schematic view of an illustrative salt barrier arrangement constructed in accordance with the principles of the present invention.

FIG. 3 shows a schematic view of one of the filter modules 72. The filter module 72 includes a front side aligned along a substantially vertical front plane A, and a back side aligned along a substantially vertical back plane B. A plurality of filter elements 74 are positioned between the front and back planes A and B. The filter elements 74 are vertically stacked in a spaced-apart and substantially parallel relationship. Each filter element 74 is aligned along a generally horizontal plane. A preferred vertical spacing s between the filter elements 74 is in the range of 1 to 6 inches.

The filter elements 74 preferably include a plurality of pleats 75 (shown in FIG. 4), and are preferably constructed of a pleated hydrophobic material. As shown in FIG. 4, the pleats are aligned generally parallel with respect to the direction of air flow (shown by arrow 77). However, it will be appreciated that in alternative embodiments, the pleats can be aligned perpendicular to or at oblique angles with respect to the direction of air flow as indicated by arrow 77.

As best shown in FIG. 4, each filter element 74 is preferably mounted in a generally rectangular frame 76. The frames 76 and filter elements 74 together form generally horizontal, vertically stacked filter shelves or panels. Potting material preferably provides a seal about the perimeter of each filter element 74 and functions to secure the filter elements 74 to their corresponding frame 76. Upstream ends of the frames 76 are preferably secured to a generally rectangular mounting flange 87 for use in connecting or clamping the module 72 to the rack 70. The module 72 also includes first and second sets of side wall pieces 73 (only one of the sets of side wall pieces is shown in FIG. 4) that extend generally between the front and back sides of the module 72. As shown in FIG. 4, the side wall pieces 73 include truncated triangular pieces. Single piece continuous side walls can also be used.

Referring back to FIG. 3, an inclined baffle 78 is located beneath each filter element 74. The baffles 78 extend between the front and back planes A and B and are preferably aligned at an angle in the range of 5 to 30 degrees, or at least 2 degrees, with respect to horizontal. As shown in FIG. 3, the baffles 78 extend between upstream and downstream ends of the frames 76, and are substantially parallel and generally planar. For example, each baffle 78 has a upstream edge 82 located generally at the front plane A and a downstream edge 83 located generally at the back plane B.

The baffles 78 incline in a direction extending from the front plane A to the back plane B such that the upstream edge 82 of each baffle 78 is lower than the downstream edge 83 of each baffle 78.

Preferably, the baffles 78 also extend between the side walls 73 of the module 72. As shown in FIG. 4, each side wall piece 73 extends upward from one of the baffles 78 to a corresponding filter panel positioned directly above the baffle 78.

The baffles 78 are arranged and configured to direct the air stream upward through the filter elements 74 and to inhibit air from by-passing the filter elements 42. As shown in FIG. 3, the baffles 78 extend between the filter elements 74 across the vertical gaps or spacing s that exists between the filter elements 74. The baffles 78 are also arranged and configured to direct the air that flows upward through the filter elements 74 outward through the back plane B of the module 72. By deflecting the air that enters and exits the module 72, uniform flow through the filter elements 74 is encouraged.

Referring again to FIG. 3, the upstream side 66 is located on the left side of the filter module 72, while the downstream side 68 is located on the right side of the filter module 72. As shown by arrows 77, air enters the module 72 through the front plane A. As the air enters the module 72, the air is directed upward (shown by arrows 80) through the filter elements 74 by top surfaces of the inclined baffles 78. After passing through the filter elements 74, the air stream is directed out the back plane B of the module 72 by bottom sides of the baffles 78. Arrows 85 represent the air exiting the module 72.

When air flows upward through the filter elements 74, deliquesced salt accumulates on bottom surfaces/upstream portions of the filters 74 and drips down onto the top surfaces of the baffles 78. The inclination of the baffles 78 is preferably sufficiently steep to cause the salt solution to run downward, against the direction of air flow, and drip off the upstream edges 82 of the baffles 80. A collection basin or drain is preferably located at the bottom of the second stage salt barrier arrangement 60 for collecting the salt solution that is removed from the air stream by the filter elements 74. Air that passes through the filter elements 74 is directed toward the ductwork 62 and flows through the ductwork 62 to the gas turbine 64.

In operation, air enters the gas turbine intake system 54 through the inlet hoods 26' and is directed in a downward direction into the upstream "dirty air" volume 34'. The air then flows from the upstream volume 34' to the downstream volume 36' through the air filters 42'. The air filters 42' remove a large percentage of the particulate material from the air stream such that the air entering the downstream volume 36' is substantially clean. However, in certain environments, salt can migrate or otherwise pass through the filters 42'. Consequently, to reduce the concentration of salt that may be present in the air stream after the first stage filtration, the air is passed through a second stage filtration step in the form of the salt barrier arrangement 60. As the air passes upward through the filter elements 74 of the salt barrier arrangement 60, salt solution accumulates on the upstream sides of the filter elements 74 and drips onto the inclined baffles 78. The salt solution then drips off the baffles 78 and is collected in a basin or drain at the bottom of the salt barrier arrangement 60. As a result, air passing through the filter elements 74 is preferably substantially free of salt. Hence, salt is inhibited from being deposited or accumulating on subsequent intake ductwork 62 or on compressor blades of the turbine system.

In general, a preferred moisture/salt barrier construction would include media as generally characterized hereinabove, to inhibit passage of moisture and salt therethrough. Because a first stage filtration step is used to efficiently filter particulate material, in certain embodiments, the salt barrier construction can use small pore sizes and can also use a static media system.

Figure 5:
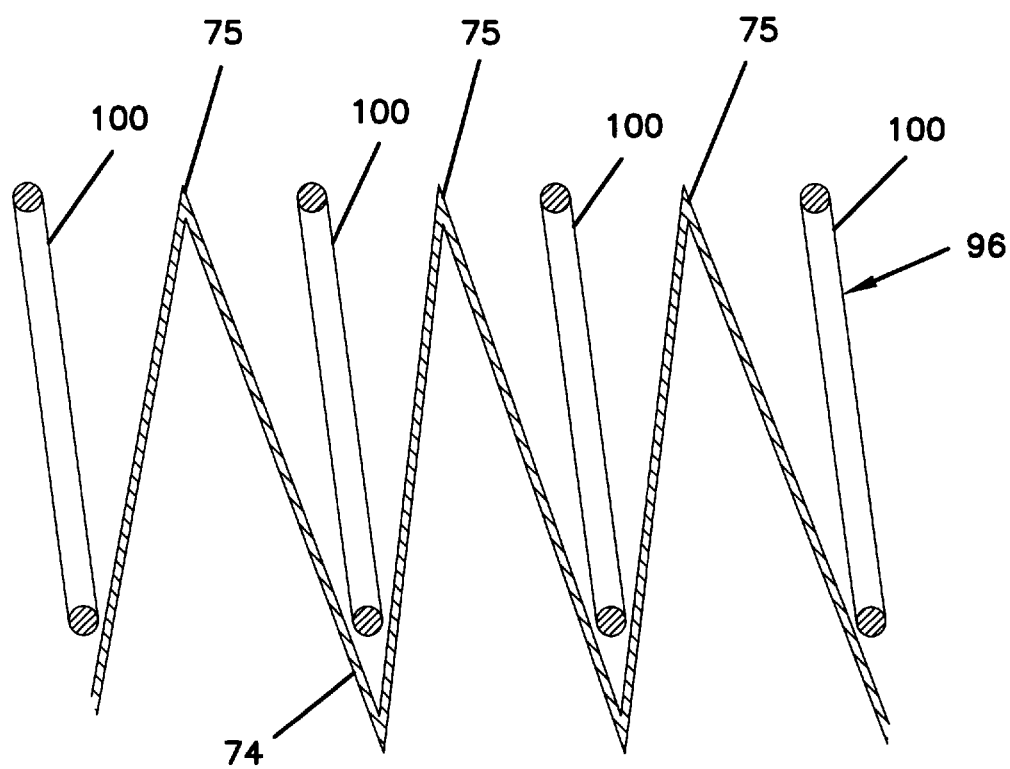
FIG. 5 is a cross-sectional view taken along section line 5—5 of FIG. 4.

Another aspect of the present invention relates to a technique for maintaining pleat spacing and/or pleat shape in a pleated filter. Generally, the aspect relates to using bent wires or other elongated elastic members having portions that straddle the pleat tips of a pleated filter, and portions that extend between the pleats for maintaining pleat spacing. For example, as shown in FIGS. 3 and 4, the filter elements 42 include helical coils 96 or springs for maintaining pleat spacing and pleat shape. As shown in FIG. 5, separate pleat tips 75 of the filter element 42 are positioned between consecutive coils 100 of the helical coil 96. Also, portions of one or more of the coils 100 are positioned between consecutive pleat tips 75 of the filter element 42, and portions of the coils 100 straddle the pleat tips 75. By varying the number of coils 100 positioned between consecutive pleat tips 75, a desired spacing between the pleat tips can also be varied. The pleat tip spacing and pleat shape can further be varied by using coils having different spring pitches, diameters and wire diameters. Furthermore, the coils can be made of a variety of materials such as metal or plastic. Additionally, coils formed by wires or members having non-round cross sections can also be used.

While FIGS. 4 and 5 illustrate springs used in association with pleated panel filters, it will be appreciated that coils can also be used for maintaining pleat spacing in other types of pleated filters such as pleated cylindrical filters. Furthermore, coils can be used for maintaining pleat shape. For example, coils can be used to control or inhibit pleat bagging or figure-8 pleats. Also, while coils or other wire/elastic member configurations are shown or described for maintaining pleat spacing, other known techniques such as spacing beads, spacing strips, or spacing bumps/projections formed on the filter medium itself can also be used.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for cleaning intake air of a gas turbine, the method comprising the steps of:
   removing particulate material from the intake air at a first stage air cleaner;
   directing the intake air downstream from the first stage air cleaner through an air flow gap to a second stage salt barrier;
   filtering salt from the intake air at the second stage salt barrier; and
   directing the intake air downstream from the second stage salt barrier to the gas turbine.

2. The method of claim 1, wherein the first stage air cleaner includes an air filter.

3. The method of claim 1, wherein the second stage salt barrier includes a hydrophobic medium.

4. A filter system for filtering intake air of a gas turbine, the filter system comprising:

a) a first stage air cleaner for reducing a concentration of particulate material in the intake air; and b) a second stage filter arrangement located downstream from the first stage air cleaner and separated from the first stage air cleaner by an air flow gap, the second stage filter arrangement including a hydrophobic medium arranged and configured to reduce a concentration of moisture in the intake air.

5. The filter system of claim 1, wherein the first stage air cleaner includes:
   a chamber through which the intake air is adapted to flow;
   a partition dividing the chamber into upstream and downstream volumes, the partition defining apertures for allowing the intake air to flow from the upstream volume to the downstream volume; and
   a plurality of air filters corresponding with the apertures of the partition, the air filters being arranged and configured to filter particulate material from the intake air that flows from the upstream volume to the downstream volume.

6. The filter system of claim 1, wherein the hydrophobic medium includes a microporous polytetrafluorethylene membrane.

7. The filter system of claim 1, wherein the second stage filter arrangement includes:
   a plurality of vertically spaced-apart hydrophobic filter elements incorporating the hydrophobic medium; and
   a plurality of inclined baffles arranged and configured to direct the intake air upward through the hydrophobic filter elements, each of the baffles being positioned beneath a corresponding one of the hydrophobic filter elements.

8. The filter system of claim 7, wherein the hydrophobic filter elements are aligned along substantially horizontal planes and are substantially parallel.

9. The salt barrier arrangement of claim 7, wherein the baffles are inclined relative to horizontal at an angle in the range of 5–30 degrees.

10. The salt barrier arrangement of claim 7, wherein the hydrophobic filter elements are pleated.

11. The salt barrier arrangement of claim 10, further comprising elastic elongated members for maintaining pleat spacing of the hydrophobic filter elements, the elongated members having portions that straddle pleat tips of the filter elements.

12. The salt barrier arrangement of claim 10, further comprising helical coils for maintaining pleat spacing of the hydrophobic filter elements.

13. The salt barrier arrangement of claim 7, wherein the hydrophobic filter elements comprise pleated panel filters.

14. The salt barrier arrangement of claim 7, wherein the hydrophobic filter elements include microporous polytetrafluorethylene membranes.

15. The salt barrier arrangement of claim 14, wherein each of the microporous polytetrafluorethylene membranes is supported by a substrate.

16. The salt barrier arrangement of claim 15, wherein the substrates are made of polyester.

17. A gas turbine system comprising:
   a gas turbine adapted to draw intake air; and
   a hydrophobic medium arranged and configured to reduce a concentration of moisture in the intake air before the intake air enters the gas turbine.

18. The gas turbine system of claim 17, wherein the hydrophobic medium comprises microporous polytetrafluorethylene.

19. The gas turbine system of claim 17, further comprising a first stage air cleaner positioned upstream from the gas turbine for reducing a concentration of particulate material in the intake air, and a second stage salt barrier arrangement located downstream from the first stage air cleaner and upstream from the gas turbine, the salt barrier arrangement including the hydrophobic medium.

* * * * *

UNITED STATES PATENT AND TRADEMARK OFFICE
CERTIFICATE OF CORRECTION

PATENT NO.     : 6,123,751
DATED          : September 26, 2000
INVENTOR(S)    : Nelson et al.

It is certified that error appears in the above-identified patent and that said Letters Patent is hereby corrected as shown below:

Column 10,
Line 9, "The filter system of claim 1," should read -- The filter system of claim 4, --
Line 21, "The filter system of claim 1," should read -- The filter system of claim 4, --
Line 24, "The filter system of claim 1," should read -- The filter system of claim 4, --

Signed and Sealed this

Thirteenth Day of August, 2002

*Attest:*

*Attesting Officer*

JAMES E. ROGAN
*Director of the United States Patent and Trademark Office*